(12) United States Patent
Shugard

(10) Patent No.: US 7,221,687 B2
(45) Date of Patent: May 22, 2007

(54) REFERENCE TIMING ARCHITECTURE

(75) Inventor: Donald David Shugard, Middletown, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 1104 days.

(21) Appl. No.: 10/150,474

(22) Filed: May 17, 2002

(65) Prior Publication Data

US 2003/0214946 A1    Nov. 20, 2003

(51) Int. Cl.
*H04J 3/06* (2006.01)
(52) U.S. Cl. .................. 370/516; 370/503; 375/358; 375/362
(58) Field of Classification Search .................. None
See application file for complete search history.

(56) References Cited

U.S. PATENT DOCUMENTS

| | | | |
|---|---|---|---|
| 5,818,839 A | 10/1998 | Sterne | |
| 5,883,533 A * | 3/1999 | Matsuda et al. | 327/156 |
| 5,903,620 A * | 5/1999 | Kariya | 375/371 |
| 5,999,543 A * | 12/1999 | Bortolini | 370/503 |
| 6,349,391 B1 | 2/2002 | Petivan | |
| 6,714,610 B1 * | 3/2004 | Wolf | 375/356 |
| 6,879,651 B2 * | 4/2005 | Saeki | 375/371 |
| 7,023,942 B1 * | 4/2006 | Roberts et al. | 375/356 |

* cited by examiner

Primary Examiner—Seema S. Rao
Assistant Examiner—Michael J. Moore

(57) ABSTRACT

A reference timing architecture is disclosed that provides a level of flexibility that was not available with the architecture in the prior art. In particular, the present invention provides for multiple reference timing outputs that can be routed to equipment nodes relying on the timing information, wherein each of the timing processing paths that provide timing outputs can be controlled independently of one another.

26 Claims, 11 Drawing Sheets

REFERENCE TIMING ARCHITECTURE

FIELD OF THE INVENTION

The present invention relates to telecommunications in general, and, more particularly, to an architecture for providing reference timing signals, which is commonly used in the nodes of synchronous networks (e.g., SONET/SDH networks, etc.).

BACKGROUND OF THE INVENTION

The first generation of optical fiber systems in the public telephone network used proprietary architectures, equipment line codes, multiplexing formats, and maintenance procedures. This diversity complicated the task of the regional Bell operating companies ("RBOCs") and the inter-exchange carriers (e.g., AT&T, Sprint, MCI, etc.) who needed to interface their equipment with these diverse systems.

To ease this task, Bellcore initiated an effort to establish a standard for connecting one optical fiber system to another. That standard is officially named the Synchronous Optical Network, but it is more commonly called "SONET." The international version of the domestic SONET standard is officially named the Synchronous Digital Hierarchy, but it is more commonly called "SDH."

Although differences exist between SONET and SDH, those differences are mostly in terminology. In most respects, the two standards are the same and, therefore, virtually all equipment that complies with either the SONET standard or the SDH standard also complies with the other. Therefore, for the purposes of this specification, the SONET standard and the SDH standard shall be considered interchangeable and the acronym/initialism "SONET/SDH" is defined as either the Synchronous Optical Network standard or the Synchronous Digital Hierarchy standard or both.

The nodes in a SONET/SDH network are synchronized to each other. In particular, SONET/SDH is governed by both frame synchronization and network synchronization. In frame synchronization, a SONET/SDH signal carries its frame pattern within its bit stream. A SONET/SDH receiver must establish frame synchronization before it can restore the bit stream of the SONET/SDH signal. In network synchronization, information transfer between interconnected synchronous systems must be possible without the data buffers in the network overflowing or buffer underflowing. Otherwise, if a buffer overflows or underflows, the underlying timing mismatch introduces degradation into the information message signal.

Underlying synchronization at both the frame level and network level is the need to have adequate timing recovery in the digital transmission system, whether or not it is SONET/SDH based. Timing recovery at equipment receiving a digital bit stream includes two issues. The first issue is how to obtain the reference clock (i.e., timing information), and the second issue is how to synchronize this clock to a benchmark or standard phase. Techniques exist in the prior art that address timing recovery issues. Furthermore, techniques to provide timing information to multiple equipment nodes exist in the prior art, as discussed below.

FIG. 1 depicts a block diagram of telecommunications network 100 in the prior art, which comprises a SONET/SDH ring network operating as a bi-directional line switching ring ("BLSR"). Telecommunications network 100 comprises five central offices, central office 101, 102, 103, 104, and 105, in which each pair of adjacent central offices is interconnected by two high-speed digital transmission lines.

Central office 101, 102, 103, 104, and 105 are interconnected for timing purposes as well as for voice and data transmission purposes. Timing interconnection in a high-speed digital network, such as telecommunications network 100, is critical for the purposes of successfully interpreting and decoding the digital information exchanged between equipment nodes.

FIG. 2 depicts a block diagram of the salient components of central office 101 in the prior art. As shown in FIG. 2, equipment cabinet 201, 202, 203, and 204 represent different telecommunications equipment nodes within central office 101. Equipment cabinet 201 constitutes a SONET/SDH node. Equipment cabinet 201 in central office 101 communicates with other SONET/SDH nodes in interconnected central office 102 via fiber 111-2-1 and fiber 112-1-2, and in central office 104 via fiber 111-1-4 and 1124-1.

Equipment cabinet 202 and 203 are T-carrier terminations. T-carrier (e.g., T-1, T-3, etc.) is a system that is used for digital telecommunication transmission. Equipment cabinet 202 interconnects with a node external to central office 101 via a dedicated T-carrier link. Equipment cabinet 203 interconnects with a node external to central office 101 via another dedicated T-carrier link.

Equipment cabinet 204 serves as an internal timing source (i.e., internal clock) for equipment within central office 101. As an internal timing source, equipment cabinet 204 can bridge, with automatic switching, short disruptions of whatever timing source is being used are the primary source. The accuracy of the internal timing source is rated at a minimum acceptable level of performance (e.g., ±20 parts per million or better, etc.).

Timing distribution system 205 provides the major source of integrated timing information within central office 101. Timing distribution system 205 accepts designated sources of timing information, evaluates the timing information against performance criteria, derives a stabilized timing signal, and then makes the timing signal available to the equipment requiring timing information. In essence, timing distribution system 205 is a source node for timing information to other nodes that require timing information.

Timing distribution system 205 accepts timing signals from a variety of sources. Path 211-1 and path 211-2 receive timing information from clock recovery circuit 206-1 and 206-2, respectively. Clock recovery circuit 206-1 through 206-5, in general, recover timing information from the information message signal in which timing is embedded. This information message signal can be SONET/SDH, T-1, T-3, or other time-division-multiplexed service signals. In the case of clock recovery circuit 206-1 and 206-2, the timing information originates from central office 102 via fiber 111-2-1 and from central office 104 via fiber 112-4-1, respectively, and is embedded within the SONET/SDH signal received. Similarly, path 211-3 provides timing information to timing distribution system 205 from SONET/SDH tributary 121. Clock recovery circuit 206-3 extracts the timing information.

Other sources of timing terminate into timing distribution system 205. Path 211-4 and 211-5 provide timing information recovered from the T-carrier links via clock recovery circuit 2064 and 206-5, respectively.

Timing distribution system 205 also accepts timing signals directly from external timing sources. Path 211-6 and 211-7 carry timing information known as BITS, or Building Integrated Timing Supply, widely used in digital networks. BITS allows for a standardized timing supply for digital networks. BITS_IN interface 207-1 and 207-2 terminate BITS signs on paths 117 and 118, respectively, and provides the BITS signals to path 211-6 and 211-7.

In addition to a variety of other possible timing inputs that are not depicted, path 211-N provides timing distribution system 205 with the timing signal from the internal clock constituting equipment cabinet 204. The number N refers to the total number of input timing information paths to timing distribution system 205.

Timing distribution system 205 also serves as a timing source node by providing timing information to receiver nodes requiring timing for synchronization purposes. Path 212-1 provides timing information to equipment cabinet 201, the SONET/SDH node within central office 101. Path 212-2 provides timing information to equipment cabinet 203, a T-carrier node. Path 212-3 provides timing information to BITS_OUT interface 208, which, in turn, provides the timing signal to a timing receiver node at a location external to central office 101 via path 119.

Other paths can provide timing information to various nodes within central office 101, external to central office 101, or both. One such path is path 212-M, which provides timing information to equipment cabinet 202, a T-carrier node. The number of output timing paths, M, can be less than, greater than, or equal to the number of input timing paths, N.

FIG. 3 depicts a block diagram of timing distribution system 205 in the prior art. Timing distribution system 205 comprises a single timing processing path. As depicted in FIG. 3, the timing processing path comprises evaluator/selector 302 and timing signal generator 303. Evaluator/selector 302 accepts a plurality of candidate timing signals 211-1 through 211-(N−1). Evaluator/selector 302 also accepts a benchmark signal (i.e., from the internal timing source depicted in FIG. 2) on path 211-N. Evaluator/selector 302 is depicted in FIG. 4 and will be discussed later in more detail.

Evaluator/selector 302 evaluates the candidate signals and selects a single active timing signal, providing it to timing signal generator 303 via path 311. Timing signal generator 303 takes the timing signal and derives a stabilized signal by passing the timing signal through a phase locked loop. Timing signal generator 303 then provides the stabilized timing signal to the receiver nodes via paths 212-1 through 212-M.

Timing signal generator 303 also accepts a backup timing signal (i.e., from the internal timing source depicted in FIG. 2) via path 211-N. The backup signal is also stabilized through the phase locked loop and is used for holdover purposes, in the event that the primary timing signal is interrupted.

FIG. 4 depicts a block diagram of evaluator/selector 302. Evaluator/selector 302 accepts a plurality of candidate signals via paths 211-1 through 211-(N−1). Evaluator 401-h, for h=1 to (N−1), accepts the candidate signal transmitted on path 211-h, appraises a characteristic of the candidate signal against that of the benchmark signal provided via path 211-N, and compares the difference to a threshold. Evaluator 401-h then provides an evaluation signal to controller 402 via path 411-h, wherein the evaluation signal is an indication of the outcome of the evaluation.

Controller 402 is used to process evaluation signals on path 411-h, for h=1 to (N−1). Controller 402 accepts the evaluation signals and derives a selection signal, provided to (N−1)-to-1 selector 403 via path 412. The selection signal can be derived by controller 402 in part by examining the evaluation signals, it is can be derived through other means.

Selector 403 accepts the selection signal via path 412 and uses the selection signal to select the candidate signal from path 211-1 through 211-(N−1) that is to be provided as output from evaluator/selector 302 via path 311.

As discussed, techniques exist in the prior art that address timing recovery and distribution. However, many of these techniques are limited in providing the flexibility that telecommunications operators require in various operating environments, in particular where there are numerous equipment nodes requiring timing information. A technique is needed that that would provide operators with the timing recovery and distribution flexibility that they require, especially as synchronized telecommunications networks grow larger and more complex.

SUMMARY OF THE INVENTION

The present invention provides a reference timing architecture that provides a level of flexibility that was not available with the architecture in the prior art. In particular, the present invention provides for multiple reference timing outputs that can be routed to equipment nodes relying on the timing information, wherein each of the timing processing paths that provide timing outputs can be controlled independently of one another. The present invention is also germane to providing system timing.

The present invention provides for the independent control of timing processing paths in part by maintaining separate evaluation criteria and thresholds, separate ordering lists of candidate waveforms, and separate selection signals for choosing new waveforms when needed.

The illustrative embodiment of the present invention comprises: a first selector for receiving a first plurality of candidate waveforms and for selecting a first active waveform from the first plurality of candidate waveforms based on a first selection signal; a first signal evaluator for deriving a first evaluation signal based on a characteristic of the first active waveform in comparison to a first threshold; a second selector for receiving a second plurality of candidate waveforms and for selecting a second active waveform from the second plurality of candidate waveforms based on a second selection signal; a second signal evaluator for deriving a second evaluation signal based on a characteristic of the second active waveform in comparison to a second threshold; and a controller for deriving the first selection signal based on the first evaluation signal and on an ordering of the first plurality of candidate waveforms, and for deriving the second selection signal based on the second evaluation signal and on an ordering of the second plurality of candidate waveforms; wherein a change in the first selection signal by the controller is independent of a change in the second selection signal by the controller; and wherein the ordering of the first plurality of candidate waveforms is independent of the ordering of the second plurality of candidate waveforms.

DETAILED DESCRIPTION

Figure 1:
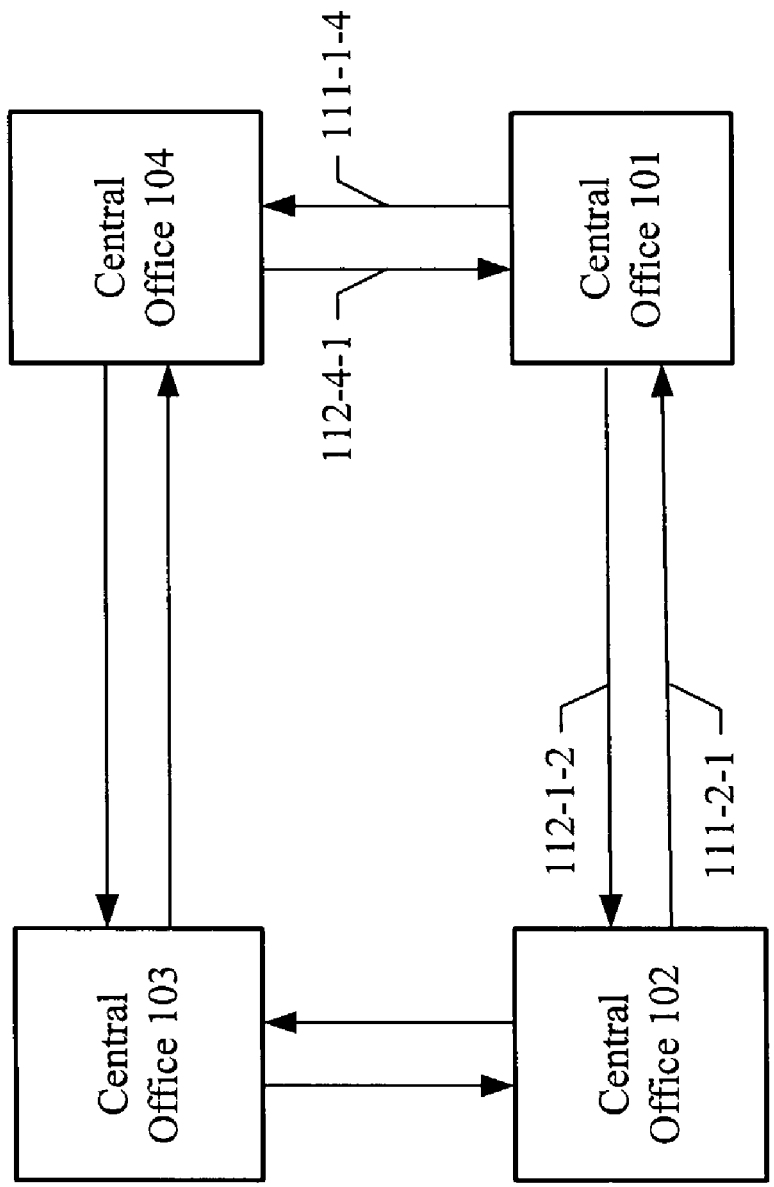
FIG. 1 depicts a block diagram of telecommunications network 100 in accordance with the prior art.
Figure 2:
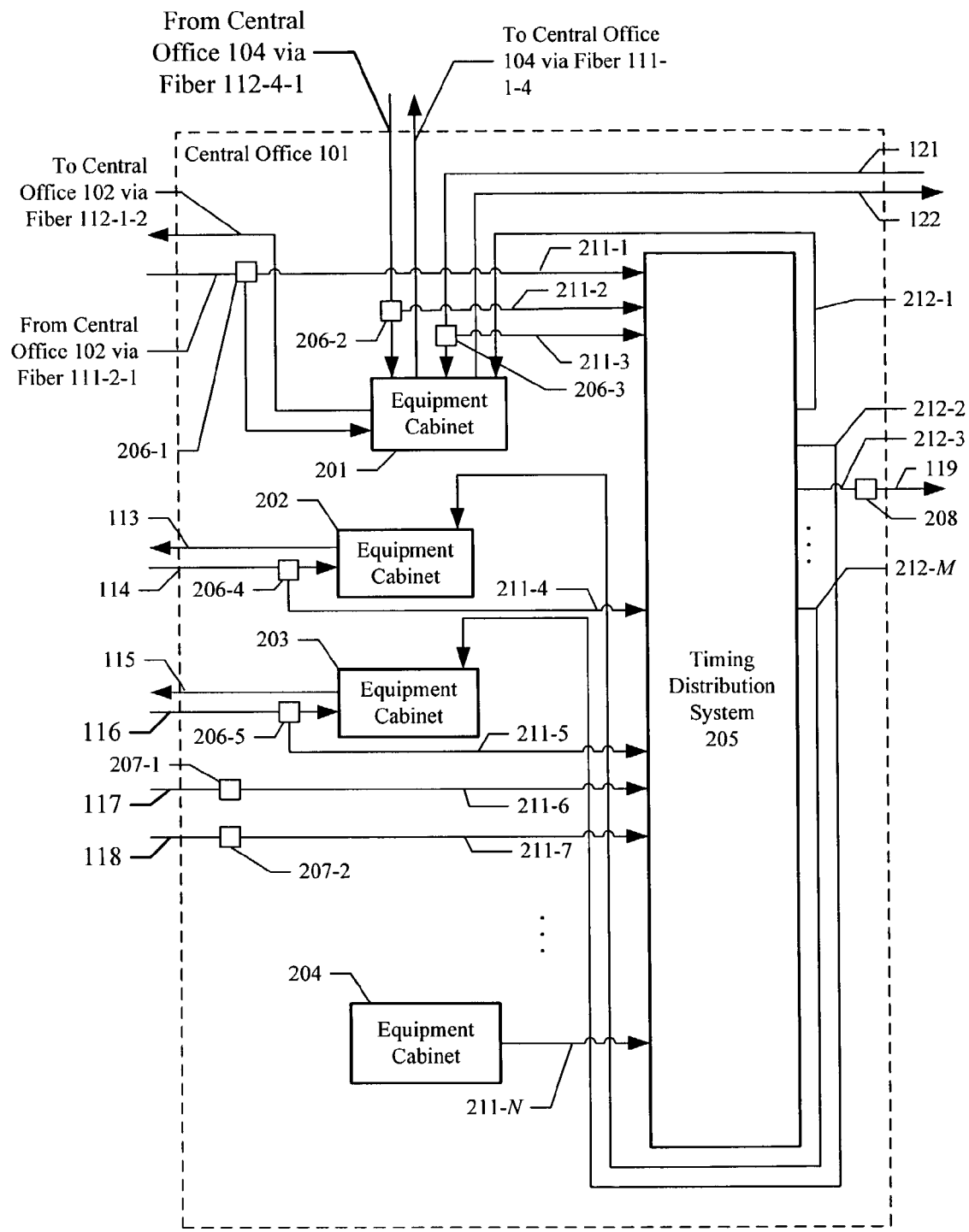
FIG. 2 depicts a block diagram of central office 101, as shown in FIG. 1, in accordance with the prior art.
Figure 3:
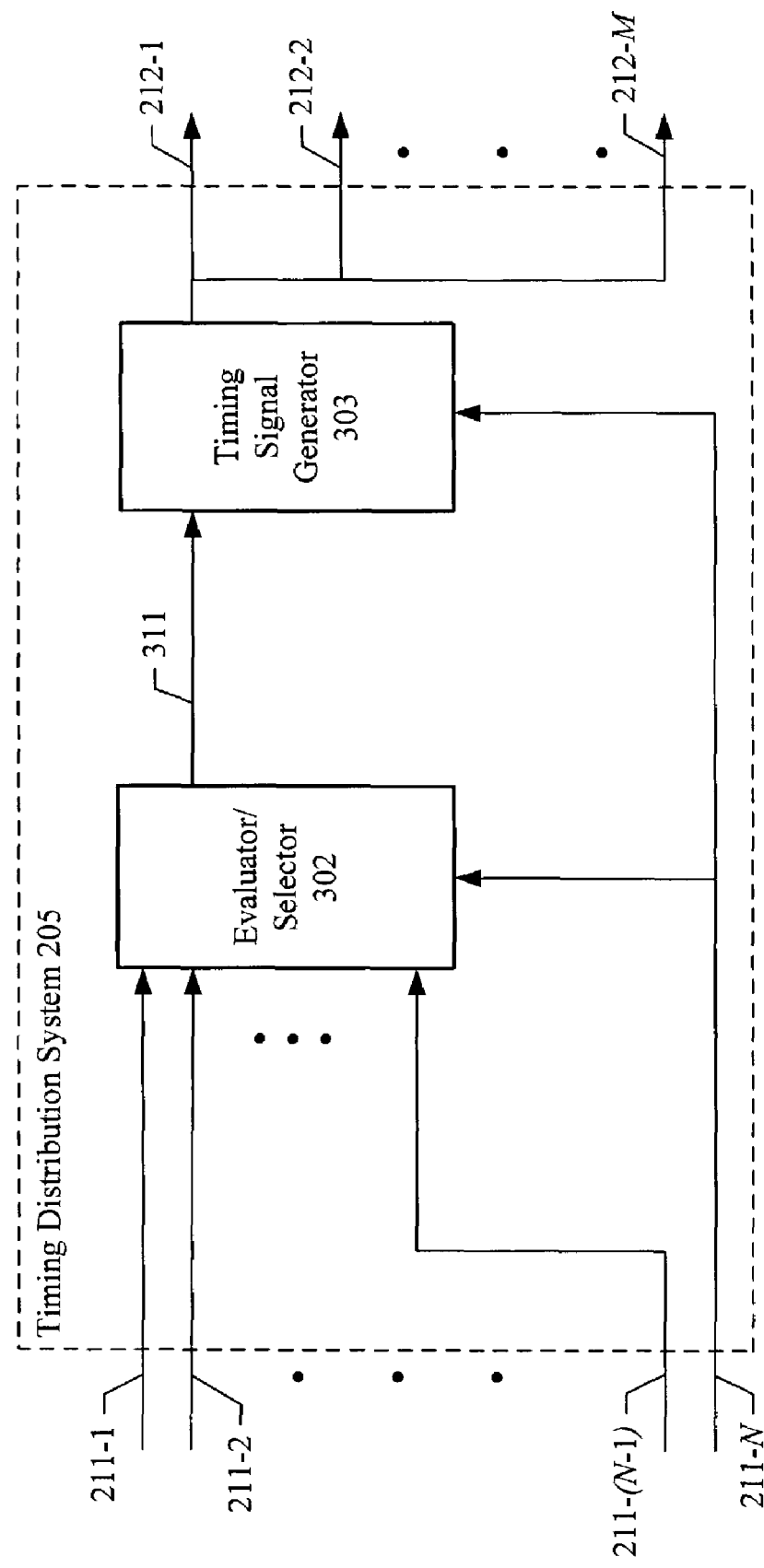
FIG. 3 depicts a block diagram of timing distribution system 205, as shown in FIG. 2, in accordance with the prior art.
Figure 4:
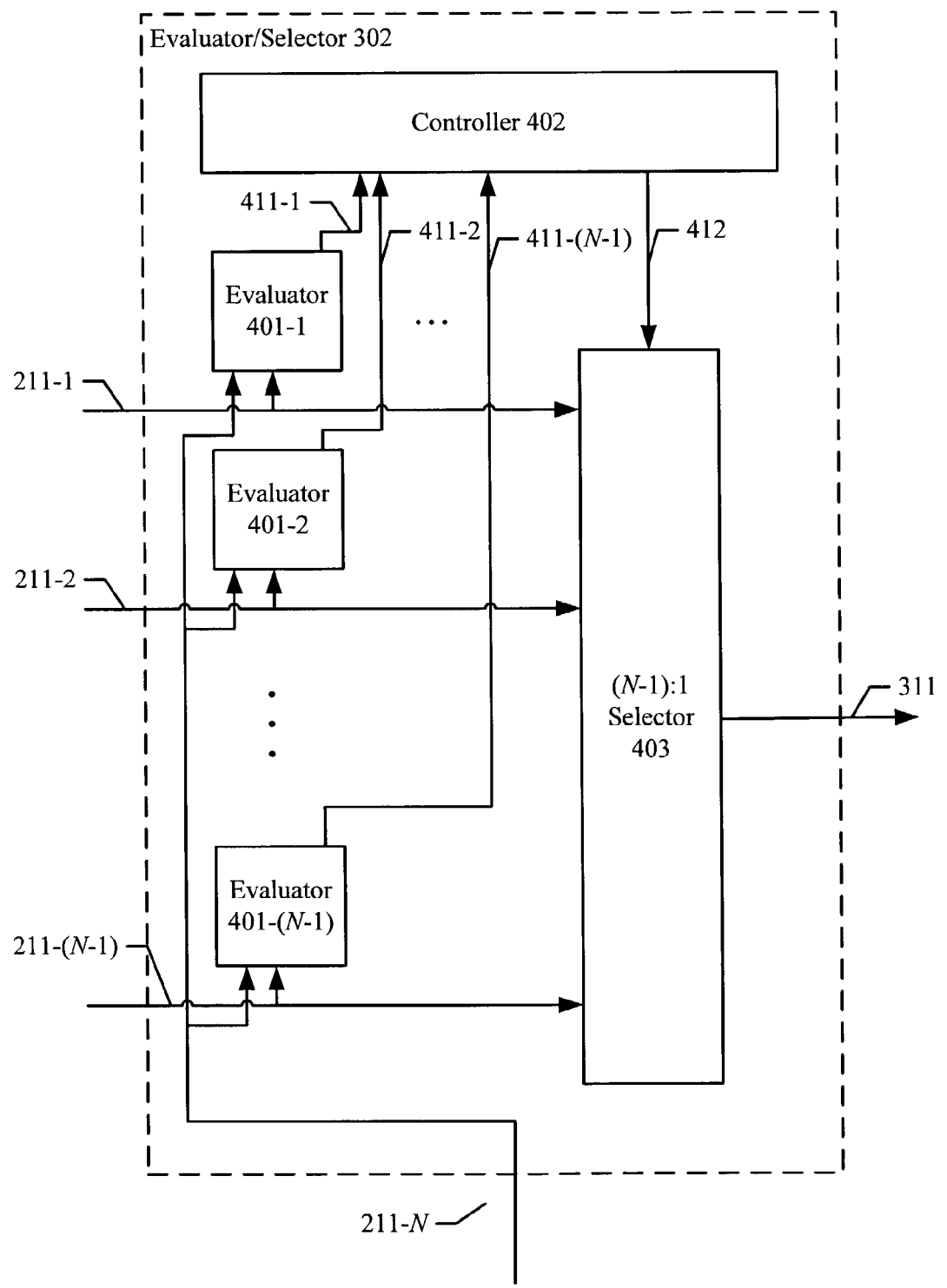
FIG. 4 depicts a block diagram of evaluator/selector 302, as shown in FIG. 3, in accordance with the prior art.
Figure 5:
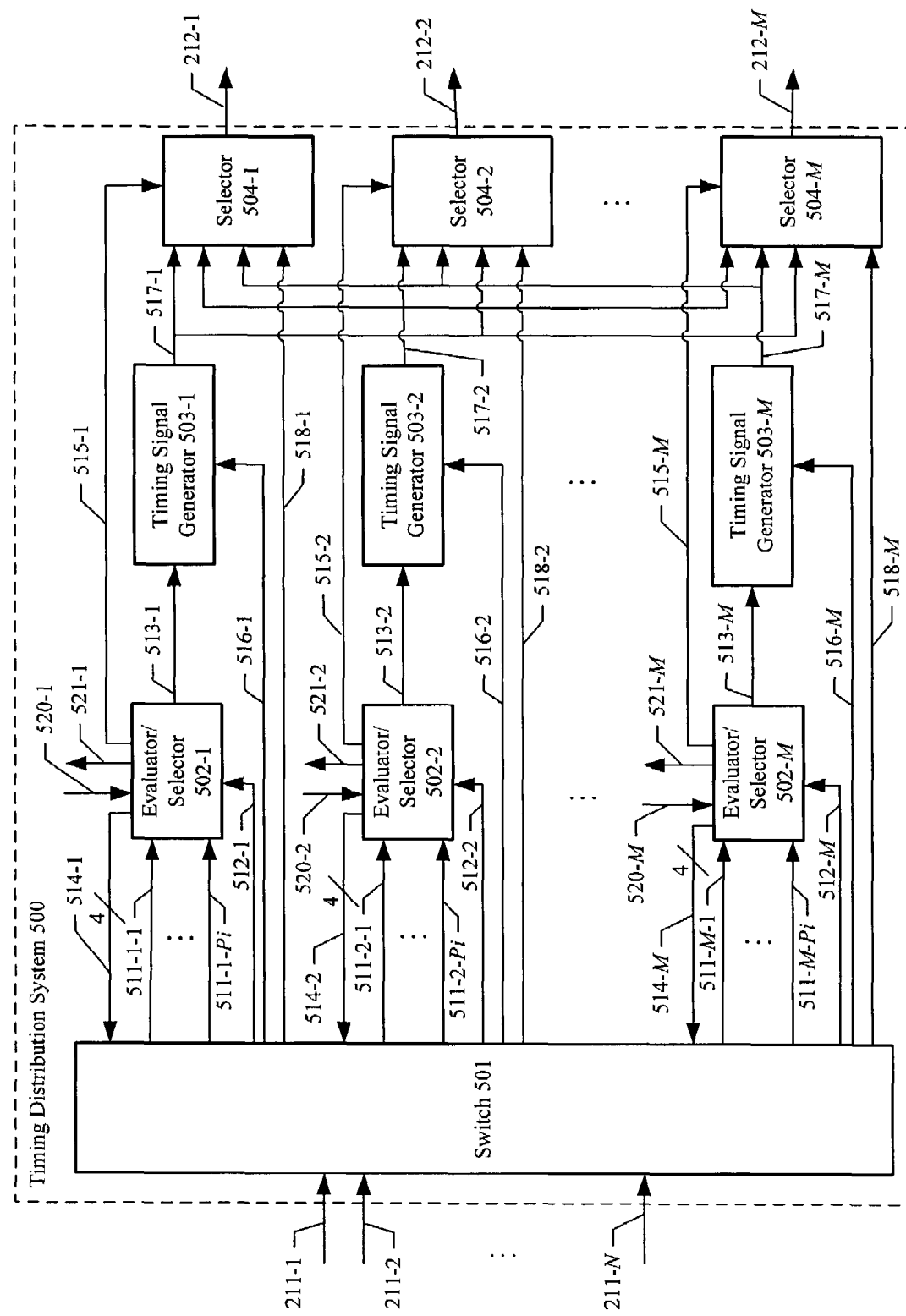
FIG. 5 depicts a block diagram of the first variation of the illustrative embodiment of the present invention.

FIG. 5 depicts the first illustrative embodiment of the present invention. Timing distribution system 500 in FIG. 5 is equivalent to timing distribution system 205 in FIG. 2 in the sense that timing distribution system 205 and 500 handle the same number and format of timing signal inputs, as well as the same number and format of timing signal outputs. One such timing signal input and output is SONET/SDH based. Although the illustrative embodiment uses the SONET/SDH protocol, it will be clear to those skilled in the art, after reading this disclosure, how to make and use embodiments of the present invention that use other protocols, such as dense wavelength division multiplexing ("DWDM"). Although the illustrative embodiment is depicted as being part of a SONET/SDH ring network, it will be clear to those skilled in the art, after reading this disclosure, how to make and use embodiments of the present invention in which some or all of the timing recovery and distribution supports a mesh or non-ring topology. Although the illustrative embodiment operates, at least in part, as a bi-directional line switched ring, it will be clear to those skilled in the art, after reading this disclosure, how to make and use embodiments of the present invention that operate in a different fashion (e.g., as a unidirectional path switched ring, as a four-fiber ring, etc.).

Timing distribution system 500 comprises at least one timing processing path. A timing processing path comprises evaluator/selector 502-i, timing signal generator 503-i, and selector 504-i, wherein i can assume a value from 1 to M, inclusive. Since the control of each timing processing path is embedded in evaluator/selector 502-i, the control architecture of timing distribution system 500 is considered to be distributed. Multiple timing processing paths share switch 501, which provides a distribution of input signals on paths 211-1 through 211-N to each plurality of candidate waveforms on paths 511-i-1 through 511-i-$P_i$, for i=1 to M. Switch 501, depicted in FIG. 6, will be discussed in detail later.

Figure 7:
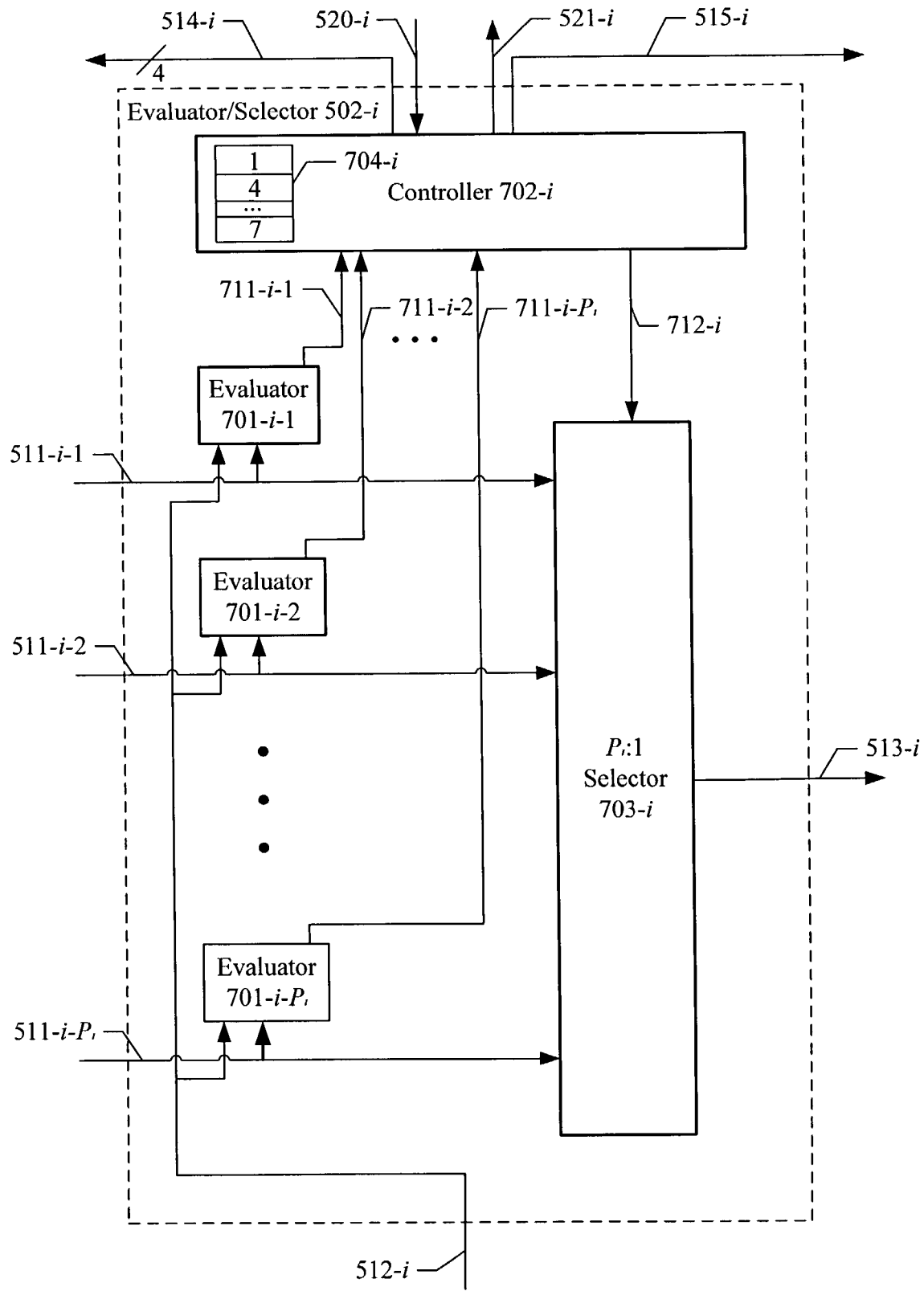
FIG. 7 depicts a block diagram of evaluator/selector 502-i, as shown in FIG. 5, in accordance with the first variation of the illustrative embodiment of the present invention.

Evaluator/selector 502-i accepts a plurality of active waveforms on paths 511-i-1 to 511-i-$P_i$, wherein $P_i$ represents the total number of signals in the plurality of candidate waveforms corresponding to evaluator/selector 502-i, implying that each plurality can comprise a different number of waveforms. Evaluator/selector 502-i also accepts a benchmark timing signal on path 512-i. Evaluator/selector 502-i selects a single active waveform signal, providing it to timing signal generator 503-i via path 513-i. Evaluator/selector 502-i also provides control signals to switch 501 and selector 504-i via paths 514-i and 515-i, respectively. Furthermore, evaluator/selector 502-i accepts user input via path 520-i and provides output to the user via path 521-i. The details of the functionality of evaluator/selector 502-i, depicted in FIG. 7, are discussed later.

Timing signal generator 503-i derives a stabilized signal by passing the active waveform provided via path 513-i through a phase locked loop. It will be understood by those skilled in the art how to make and use phase locked loop circuits. It will also be understood by those skilled in the art how to use circuits other than phase locked loops to stabilize a timing signal.

Timing signal generator 503-i also accepts a backup timing signal via path 516-i. The backup timing signal can be from a local oscillator within an internal clock or it can be from another source as selected by switch 501. The backup signal is also stabilized through the phase locked loop and is used for holdover purposes, in the event that the primary timing is interrupted. It will be understood by those skilled in the art how to make and use equipment to switch over the timing source from the primary to the backup in the event of an interruption.

Timing signal generator 503-i then provides the stabilized signal to selector 504-i via path 517-i.

Selector 504-i accepts stabilized signals from timing signal generator 503-1 through 503-M. Selector 504-i also accepts a signal directly from switch 501 via path 518-i. A reference signal placed onto path 212-i is selected from the input signals to selector 504-i based on the control signal on path 515-i. It will be clear to those skilled in the art how to make and use selector 504-i. It will be clear to those skilled in the art how to make and use timing processing paths in timing distribution system 500, such that selector 504-i omitted on some, all, or none of the timing processing paths.

Figure 6:
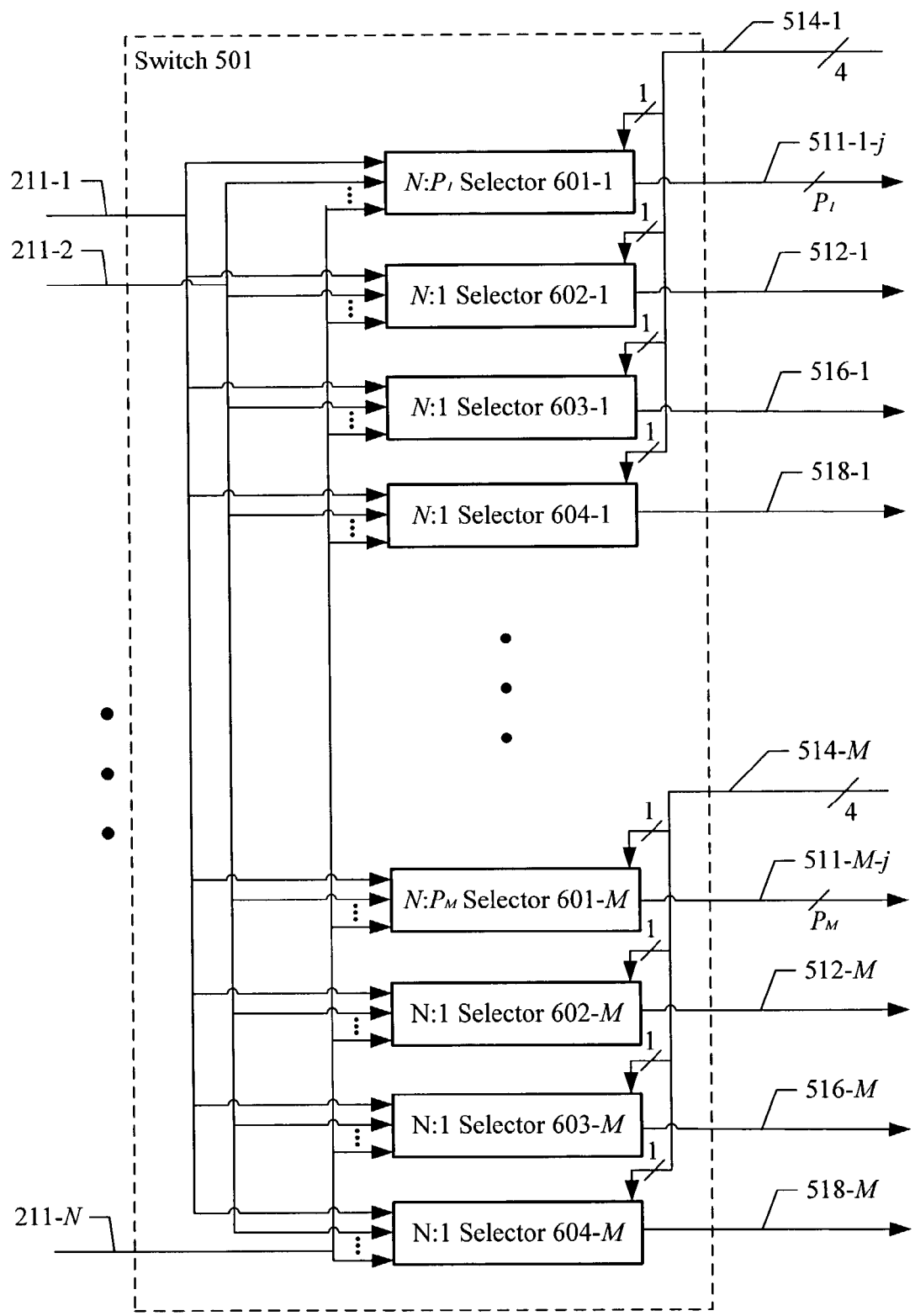
FIG. 6 depicts a block diagram of switch 501, as shown in FIG. 5, in accordance with the first variation of the illustrative embodiment of the present invention.

FIG. 6 depicts a block diagram of switch 501. Switch 501 accepts a plurality of candidate waveforms via paths 211-1 through 211-N. The plurality of candidate waveforms is made available to each of selector 601-i, 602-i, 603-i, and 604-i, for i=1 to M.

Selector 601-i is an N-to-$P_i$ selector for selecting at least one candidate waveform to be placed on path 511-i-j, for j=1 to $P_i$. Selector 602-i is an N-to-1 selector for selecting a waveform to be placed on path 512-i. Selector 603-i is an N-to-1 selector for selecting a waveform to be placed on path 516-i. Selector 604-i is an N-to-1 selector for selecting a waveform to be placed on path 518-i. Selection signals on path 514-i control the selection of the waveforms to be passed through the four selectors. Note that the control of each of the four selectors depicted for path i is independent across selectors. It will be clear to those skilled in the art how to make and use selector 601-i, 602-i, 603-i, and 604-i.

FIG. 7 depicts a block diagram of evaluator/selector 502-i. Evaluator/selector 502-i accepts a plurality of candidate waveforms via paths 511-i-j, for j=1 to $P_i$. Evaluator 701-i-j accepts the candidate waveform transmitted on path 511-i-j, appraises a characteristic of the candidate waveform, checks the candidate waveform against a benchmark signal provided by path 512-i, and compares the difference between the two signals to a threshold. The characteristic can be a variation in frequency, it can be a variation in phase, or it can be some other property. Evaluator 701-i-j then provides an evaluation signal to controller 702-i, wherein the evaluation signal represents the outcome of the evaluation. It will be clear to those skilled in the art how to make and use evaluator 701-i-j.

Where there is more than one evaluator 701-i-j within evaluator/selector 502-i, the resources can be typically used to periodically or sporadically re-evaluate standby waveforms, even if the active waveform currently in use is valid (i.e., qualified). It will be clear to those skilled in the art how to make and use processing schemes that utilize some or all of evaluator 701-i-1 through 701-i-$P_i$ for purposes comprising periodically or sporadically re-evaluating standby waveforms.

Controller 702-i is used to process evaluation signals on path 711-i-j, for j=1 to $P_i$. Controller 702-i accepts the evaluation signals and derives a corresponding set of selection signals, provided to switch 501 via path 514-i and to selector 703-i via path 712-i. More details concerning the method of how the various signals are derived and used are discussed in the description accompanying FIG. 10 and 11. At a high-level, the selection signal is derived by controller 702-i based on the evaluation signal and on an ordering of the plurality of candidate waveforms.

The ordering of candidate waveforms represents the order in which candidate waveforms should be switched in to be considered as the next active waveform when needed. The ordering can be determined by the user and provided to the controller via path 520-i, the ordering can be determined by an algorithm, or the ordering can be determined through some other means. It will be clear to those skilled in the art how to determine the ordering of the candidate waveforms. The ordering can be maintained as a list that is stored in memory in controller 702-i. It will be clear to those skilled in the art how to make and use memory to store a list or an equivalent representation of the ordering of candidate waveforms. Ordering list 704-i reflects the order that the candidate waveforms are to be tried as active waveforms, should the need arise.

Controller 702-i also provides a control signal to selector 504-i via path 515-i. This control can be issued directly by the user via path 520-i, derived within controller 702-i, or derived through other means. It will be clear to those skilled in the art how to derive a control signal for selector 504-i.

Controller 702-i accepts user input via path 520-i. The user input can be used to establish orderings of candidate waveforms (e.g., specified priority list, etc.), specify which timing processing path gets mapped to a specific timing output path, specify performance characteristics and thresholds, and issue other operating commands. It will be clear to those skilled in the art how to create and use information from the user. Controller 702-i also provides output to the user via path 521-i. The user output can be used to provide status, error alerts, and confirmations to user input commands. It will be clear to those skilled in the art how to create and use information for the user. It will be clear to those skilled in the art how to make and use controller 702-i.

Selector 703-i accepts the selection signal via path 712-i-j, for j=1 to $P_i$, and uses the selection signal to select the waveform from path 511-i-j, for j=1 to $P_i$, to be provided as output from evaluator/selector 502-i via path 513-i. It will be clear to those skilled in the art how to make and use selector 703-i.

Figure 8:
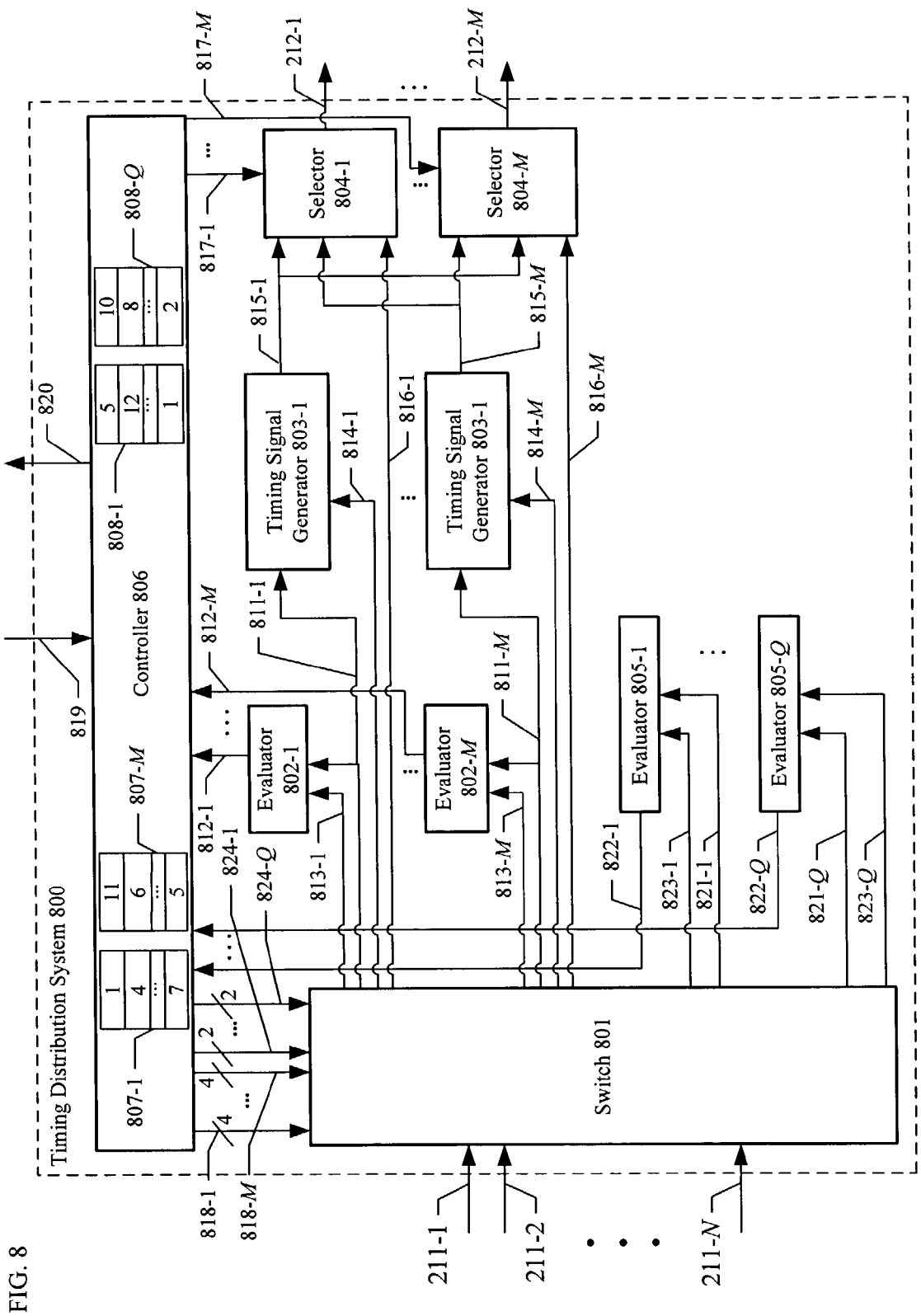
FIG. 8 depicts a block diagram of the second variation of the illustrative embodiment of the present invention.

FIG. 8 depicts the second illustrative embodiment of the present invention. Timing distribution system 800 in FIG. 8 is equivalent to timing distribution system 500 in FIG. 5, in the sense that timing distribution system 500 and 800 handle the same number and format of timing signal inputs, as well as the same number and format of timing signal outputs. Timing distribution system 800 comprises at least one timing processing path. A timing processing path comprises evaluator 802-i, timing signal generator 803-i, and selector 804-i, wherein i can assume a value from 1 to M, inclusive. Multiple timing processing paths share switch 801, which provides a distribution of input signals on paths 211-1 through 211-N to paths 811-i, for i=1 to M. Switch 801 also provides a distribution of input signals on paths 211-1 through 211-N to paths 821-k, for k=1 to Q. Switch 801 will be discussed in detail later.

Since the control of every timing processing path is handled by a common entity, controller 806 (to be discussed later), the control architecture of timing distribution system 800 considered to be centralized, rather than distributed.

Evaluator 802-i accepts the active waveform transmitted on path 811-i, appraises a characteristic of the active waveform, checks the active waveform against a benchmark signal provided by path 813-i, and compares the difference to a threshold. The characteristic can be a variation in frequency, it can be a variation in phase, or it can be some other property. Path 813-i can carry the same benchmark signal to evaluator 802-i, for i=1 to M, or path 813-i can carry a different signal to each evaluator 802-i. Evaluator 802-i then provides an evaluation signal to controller 806 via path 812-i, wherein the evaluation signal represents the outcome of the evaluation. It will be clear to those skilled in the art how to make and use evaluator 802-i.

Timing signal generator 803-i takes the active waveform on path 811-i and derives a stabilized signal by passing the active waveform through a phase locked loop. It will be clear to those skilled in the art how to make and use phase locked loop circuits or equivalent circuits as part of timing signal generator 803-i.

Timing signal generator 803-i also accepts a backup timing signal via path 814-i. The backup timing signal can be from a local oscillator within an internal clock or it can be from another source. The backup signal is also stabilized through the phase locked loop and is used for holdover purposes, in the event that the primary timing is interrupted. It will be understood by those skilled in the art how to make and use equipment to switch over the timing source from the primary to the backup in the event of an interruption.

Timing signal generator 803-i then provides the stabilized signal to selector 804-i via path 815-i.

Selector 804-i accepts stabilized signals from timing signal generator 803-i, for i=1 to M via path 815-i. Selector 804-i also accepts signals from switch 801 via path 816-i. A single reference signal placed onto path 212-i is selected from the input signals to selector 804-i based on the control signal on path 817-i. It will be clear to those skilled in the art how to make and use selector 804-i. It will be clear to those skilled in the art how to make and use timing processing paths in timing distribution system 800, such that selector 804-i is omitted on some, all, or none of the timing processing paths.

FIG. 8 depicts a block diagram that also comprises timing processing paths that are used to evaluate standby waveforms. Evaluator 805-k accepts the standby waveform transmitted on path 821-k, appraises a characteristic of the standby waveform, checks the standby waveform against a benchmark signal provided by path 823-k, and compares the difference to a threshold. Path 823-k can carry the same benchmark signal to evaluator 805-k, for k=1 to Q, or path 823-*k* can carry a different signal to each evaluator 805-k. Evaluator 805-k then provides an evaluation signal to controller 806, wherein the evaluation signal represents the outcome of the evaluation. It will be clear to those skilled in the art how to make and use evaluator 805-k.

Controller 806 is used to process evaluation signals on path 812-i, for i=1 to M active timing processing paths.

Controller 806 accepts the evaluation signals and derives a corresponding set of selection signals, provided to switch 801 via path 818-i, for i=1 to M. Controller also provides control signals to selector 804-i via path 817-i. Furthermore, controller 806 is used to process evaluation signals on path 822-k, for k=1 to Q standby timing processing paths. Controller 806 accepts the evaluation signals and derives a corresponding set of selection signals, provided to switch 801 via path 824-k, for k=1 to Q. More details concerning the method of how the various signals are derived and used are discussed in the description accompanying FIG. 10 and 11. At a high-level, the selection signal is derived by controller 806 based on the evaluation signal and on an ordering of the plurality of candidate waveforms.

The ordering of candidate waveforms represents the order in which candidate waveforms should be switched in to be considered as the next active waveform when needed. The ordering can be determined by the user and provided to the controller via path 819, the ordering can be determined by an algorithm, or the ordering can be determined through some other means. It will be clear to those skilled in the art how to determine the ordering of the candidate waveforms. The ordering can be maintained as a list that is stored in memory in controller 806. It will be clear to those skilled in the art how to make and use memory to store a list or an equivalent representation of the ordering of candidate waveforms. Ordering list 807-i, for i=1 to M, reflects the order for each timing processing path i that the candidate waveforms are to be tried as active waveforms, should the need arise. Ordering list 808-k, for k=1 to Q standby processing paths, reflects the order that the candidate waveforms are to be tried as standby waveforms on the paths.

Controller 806 also provides a control signal to selector 804-i via path 817-i. This control can be issued directly by the user via path 819, derived within controller 806, or derived through other means. It will be clear to those skilled in the art how to derive a control signal for selector 804-i.

Controller 806 accepts user input via path 819. The user input can be used to establish orderings of candidate waveforms (e.g., specified priority list, etc.), specify which timing processing path gets mapped to a specific timing output path, specify performance characteristics and thresholds, and issue other operating commands. It will be clear to those skilled in the art how to create and use information from the user. Controller 806 also provides output to the user via path 820. The user output can be used to provide status, error alerts, and confirmations to user input commands. It will be clear to those skilled in the art how to create and use information for the user. It will be clear to those skilled in the art how to make and use controller 806.

Figure 9:
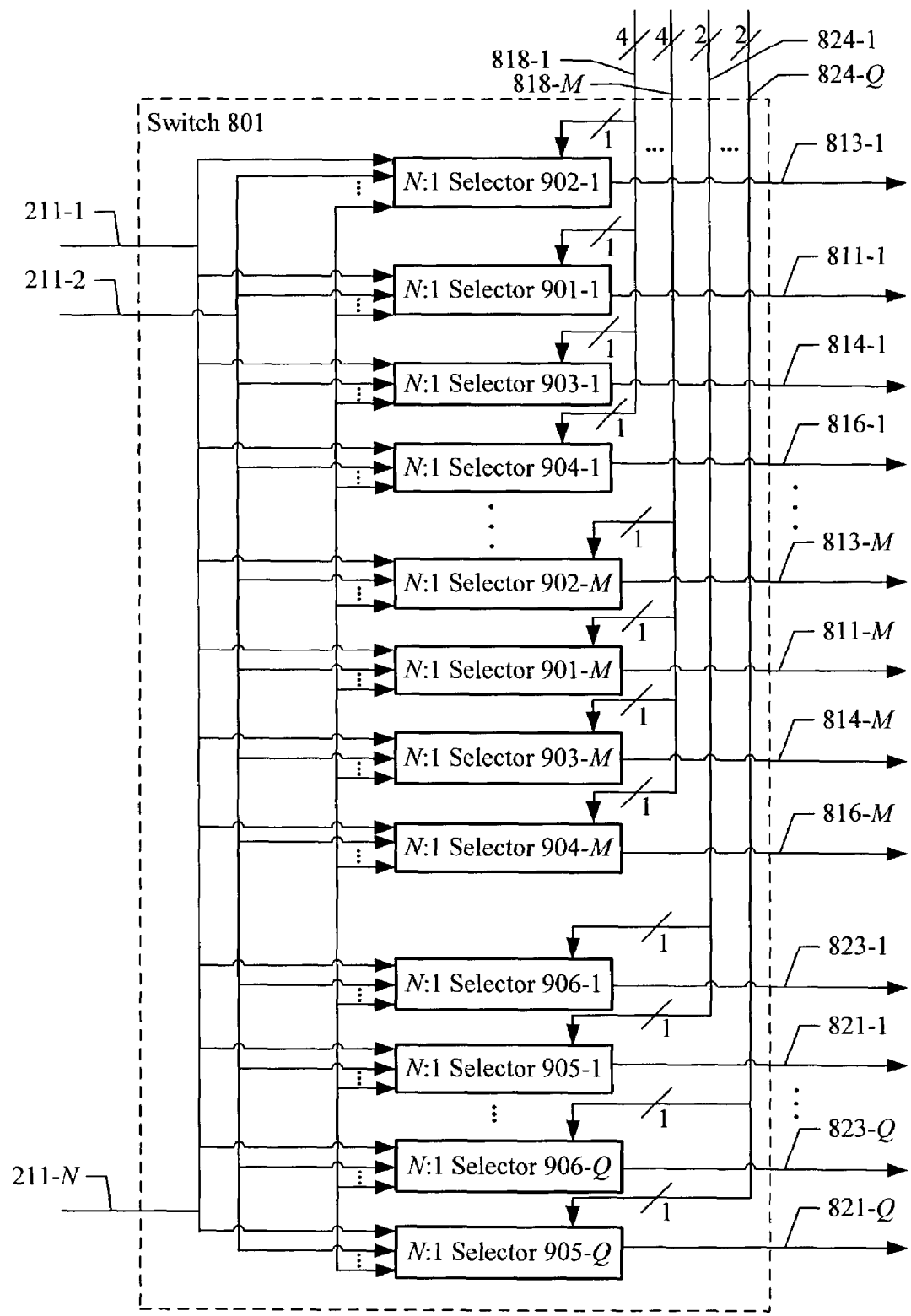
FIG. 9 depicts a block diagram of switch 801, as shown in FIG. 8, in accordance with the second variation of the illustrative embodiment of the present invention.

FIG. 9 depicts a block diagram of switch 801. Switch 801 accepts a plurality of candidate waveforms via paths 211-1 through 211-N. The plurality of candidate waveforms is made available to each of selector 901-i, 902-i, 903-i, and 904-i, for i=1 to M; and to selector 905-k and 906-k, for k=1 to Q.

Selector 901-i is an N-to-1 selector for selecting a candidate waveform to be placed on path 811-i. Selector 902-i is an N-to-1 selector for selecting a waveform to be placed on path 813-i. Selector 903-i is an N-to-1 selector for selecting a waveform to be placed on path 814-i. Selector 904-i is an N-to-1 selector for selecting a waveform to be placed on path 816-i. Selection signals on path 818-i control the selection of the waveforms to be passed through the four selectors. Note that the control of each of the four selectors depicts for path i is independent across selectors. It will be clear to those skilled in the art how to make and use selector 901-i, 902-i, 903-i, and 904-i.

Selector 905-k is an N-to-1 selector for selecting a candidate standby waveform to be placed on path 821-k. Selector 906-k is an N-to-1 selector for selecting a waveform to be placed on path 823-k. Selection signals on path 824-k control the selection of the waveforms to be passed through the two selectors. Note that the control of each of the two selectors depicts for standby path k is independent across selectors. It will be clear to those skilled in the art how to make and use selector 905-k and 906-k.

The operating environment of timing distribution system 500 and 800 can comprise additional equipment cabinets in support of additional synchronous networks, timing-sensitive networks, and high-speed networks, as well as asynchronous networks, timing-insensitive networks, and low-speed networks. Correspondingly, timing distribution system 500 and 800 can accept a different number of timing signal inputs than depicted and can provide a different number of timing signal outputs than depicted.

Figure 10:
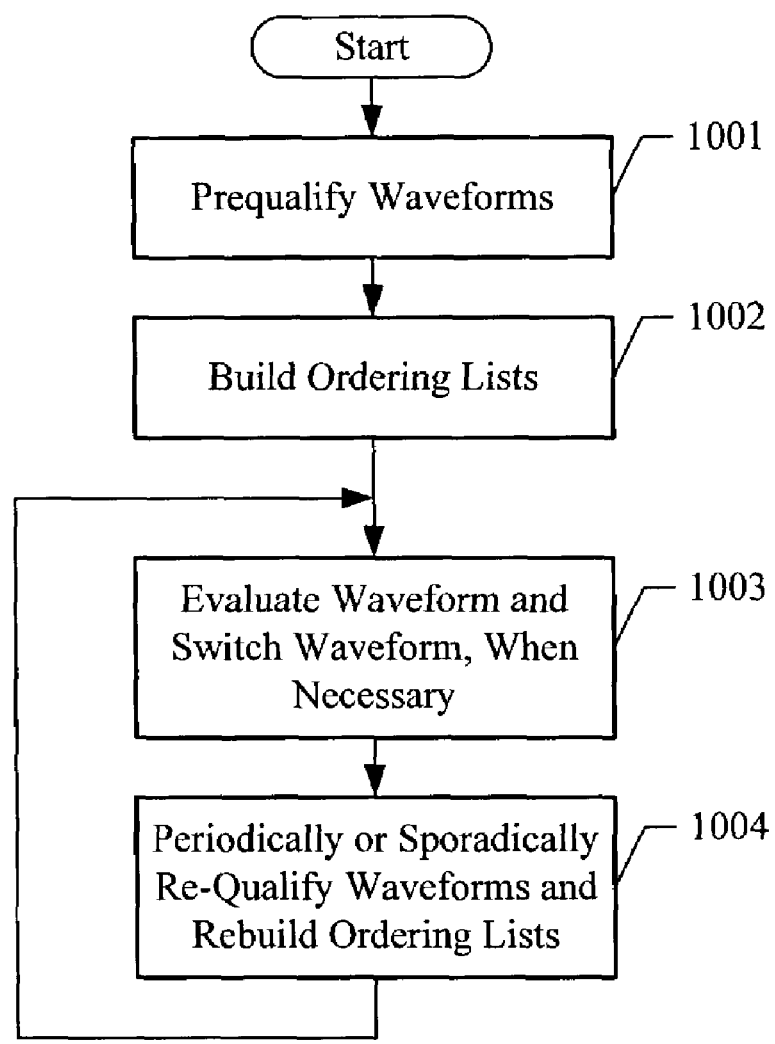
FIG. 10 depicts a flowchart of the tasks performed by the reference timing architecture.

FIG. 10 depicts a flowchart of the tasks performed by timing distribution system 500 and 800. The tasks involved in the illustrative embodiment fall into two categories: the startup phase, in which timing distribution system 500 and 800 are initializing, and the run phase, in which timing distribution system 500 are 800 have completed initializing. It will be clear to those skilled in the art which of the tasks depicted in FIG. 10 can be performed simultaneously or in a different order than that depicted in FIG. 10.

At task 1001, the system pre-evaluates the active waveforms selected from a set of candidate waveforms to ensure that the initial set of waveforms to be used as reference signals is valid.

At task 1002, the system builds the list reflecting the ordering of candidate waveforms to be considered for evaluation going forward. The list can originate from input from the user, the list can be generated by an algorithm, or the list can be derived in another way in well-known fashion to those skilled in the art.

At task 1003, having reached the run phase of the illustrative embodiment, the system evaluates the active waveform and switches waveforms, if necessary. Task 1003 is depicted in more detail in FIG. 11.

At task 1004, the system waits for a periodic or sporadic trigger to re-qualify the waveforms and to rebuild the list reflecting the ordering of candidate waveforms. The trigger can be implemented through a timer, the trigger can be based on an interrupt generated by a related process, or the trigger can be based on something else. It will be clear to those skilled in the art how to make and use a trigger in support of task 1004.

The run phase continues indefinitely across tasks 1003 and 1004.

Figure 11:
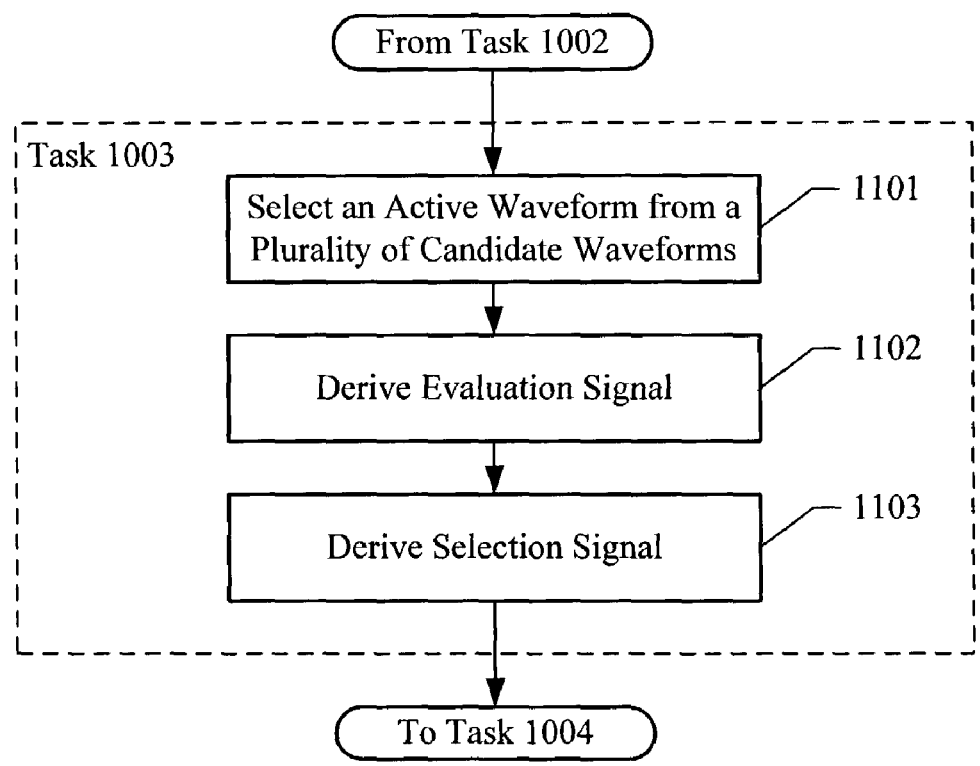
FIG. 11 depicts a flowchart of the tasks related to evaluating a waveform and switching in a new waveform, as shown in FIG. 10.

FIG. 11 depicts a detailed flowchart of task 1003. When performed, the steps depicted in FIG. 11 evaluate each active waveform currently in use and switch to a new active waveform or waveforms when necessary or advantageous. It will be clear to those skilled in the art which of the tasks depicted in FIG. 11 can be performed simultaneously or in a different order than that depicted in FIG. 11.

At task 1101, the system selects an active waveform from a plurality of candidate waveforms. The selection is based on a selection signal.

At task 1102, the system derives an evaluation signal. The evaluation signal is based on a characteristic of the active waveform in comparison to a threshold. The characteristic can be a variation in frequency, it can be a variation in phase, or it can be some other property.

At task 1103, the system derives a selection signal. The selection signal is based on the evaluation signal and on an ordering of the candidate waveforms (i.e., the list that has already been built previously at least once).

In one embodiment of task 1103, suppose that there are, for example, two processes running concurrently across two timing processing paths. In this embodiment, a change in the first selection signal (corresponding to the first timing processing path) is independent of a change in the second selection signal (corresponding to the second timing processing path). Furthermore, the ordering of the candidate waveforms in the first timing processing path is independent of the ordering of candidate waveforms in the second timing processing path.

In an alternative embodiment of task 1003, each selection signal is based on the state of multiple evaluation signals and on the ordering of the candidate waveforms. In this alternative embodiment of task 1003, where there are, for example, two processes running concurrently, a change in the first selection signal (corresponding to the first timing processing path) is accompanied by a change in the second selection signal (corresponding to the second timing processing path). At the same time, the ordering of candidate waveforms in the first timing processing path is independent of the ordering of candidate waveforms in the second timing processing path.

In an additional alternative embodiment of task 1003, the selection signal is based on the state of multiple evaluation signals and on a common ordering of the candidate waveforms. Additionally, where there are, for example, two processes running concurrently, the characteristic used to evaluate each active waveform can be different from each other. Alternatively, the characteristic used to evaluate each active waveform can be the same with the threshold that is used to evaluate each active waveform being different from one waveform to another.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus for providing a reference timing signal for use in a synchronous network, the apparatus comprising:
a first selector for receiving a first plurality of candidate waveforms and for selecting a first active waveform from said first plurality of candidate waveforms based on a first selection signal;
a first signal evaluator for deriving a first evaluation signal based on a characteristic of said first active waveform in comparison to a first threshold;
a second selector for receiving a second plurality of candidate waveforms and for selecting a second active waveform from said second plurality of candidate waveforms based on a second selection signal;
a second signal evaluator for deriving a second evaluation signal based on a characteristic of said second active waveform in comparison to a second threshold; and
a controller for deriving said first selection signal based on said first evaluation signal and on an ordering of said first plurality of candidate waveforms, and for deriving said second selection signal based on said second evaluation signal and on an ordering of said second plurality of candidate waveforms;
wherein a change in the first selection signal by said controller is independent of a change in said second selection signal by said controller; and
wherein said ordering of said first plurality of candidate waveforms is independent of said ordering of said second plurality of candidate waveforms;
a first timing signal generator for deriving a first stabilized signal based on said first active waveform;
a second timing signal generator for deriving a second stabilized signal based on said second aactive waveform; and
a third selector for selecting a reference timing signal from said first stabilized signal and said second stabilized signal.

2. The apparatus of claim 1 wherein said characteristic of said first active waveform is variation in frequency.

3. The apparatus of claim 1 wherein said characteristic of said first active waveform is variation in phase.

4. The apparatus of claim 1 further comprising:
a third selector for receiving a third plurality of candidate waveforms and for selecting a first standby waveform from said third plurality of candidate waveforms; and
a third signal evaluator for deriving a third evaluation signal based on a characteristic of said first standby waveform in comparison to a third threshold;
wherein said controller derives said first selection signal based on said first evaluation signal, said third evaluation signal, and on said ordering of said third plurality of candidate waveforms.

5. An apparatus for providing a reference timing signal for use in a synchronous network, the apparatus comprising:
a first selector for receiving a first plurality of candidate waveforms and for selecting a first active waveform from said first plurality of candidate waveforms based on a first selection signal;
a first signal evaluator for deriving a first evaluation signal based on a characteristic of said first active waveform in comparison to a first threshold;
a second selector for receiving a second plurality of candidate waveforms and for selecting a second active waveform from said second plurality of candidate waveforms based on a second selection signal;
a second signal evaluator for deriving a second evaluation signal based on a characteristic of said second active waveform in comparison to a second threshold; and
a controller for deriving said first selection signal based on said first evaluation signal, said second evaluation signal, and on an ordering of said first plurality of candidate waveforms, and for deriving said second selection signal based on said first evaluation signal, said second evaluation signal, and on an ordering of said second plurality of candidate waveforms;
wherein a change in the first selection signal by said controller is accompanied by a change in said second selection signal by said controller; and
wherein said ordering of said first plurality of candidate waveforms is independent of said ordering of said second plurality of candidate waveforms;
a first timing signal generator for deriving a first stabilized signal based on said first active waveform;
a second timing signal generator for deriving a second stabilized signal based on said second active waveform; and a third selector for selecting a reference timing signal from said first stabilized signal and said second stabilized signal.

6. The apparatus of claim 5 wherein said characteristic of said first active waveform is variation in frequency.

7. The apparatus of claim 5 wherein said characteristic of said first active waveform is variation in phase.

8. The apparatus of claim 5 further comprising:
a third selector for receiving a third plurality of candidate waveforms and for selecting a first standby waveform from said third plurality of candidate waveforms; and
a third signal evaluator for deriving a third evaluation signal based on a characteristic of said first standby waveform in comparison to a third threshold;
wherein said controller derives said first selection signal based on said first evaluation signal, said third evaluation signal, and on said ordering of said third plurality of candidate waveforms.

9. An apparatus for providing a reference timing signal for use in a synchronous network, the apparatus comprising:
a first selector for receiving a plurality of candidate waveforms and for selecting an active waveform from said plurality of candidate waveforms based on a selection signal;
a first signal evaluator for deriving a first evaluation signal based on a first characteristic of said active waveform in comparison to a first threshold;
a second selector for receiving said plurality of candidate waveforms and for selecting said active waveform from said plurality of candidate waveforms based on said selection signal;
a second signal evaluator for deriving a second evaluation signal based on a second characteristic of said active waveform in comparison to a second threshold; and
a controller for deriving said selection signal based on said first evaluation signal, said second evaluation signal, and on an ordering of said plurality of candidate waveforms;
and a timing signal generator for deriving a reference timing signal based on said active waveform.

10. The apparatus of claim 9 wherein said first characteristic and said second characteristic are different.

11. The apparatus of claim 9 wherein said first characteristic and said second characteristic are the same; and
wherein said first threshold is different than said second threshold.

12. The apparatus of claim 9 wherein said first characteristic is variation in frequency.

13. The apparatus of claim 9 wherein said first characteristic is variation in phase.

14. A method for providing a reference timing signal for use in a synchronous network, the method comprising:
selecting a first active waveform from a first plurality of candidate waveforms based on a first selection signal;
deriving a first evaluation signal based on a characteristic of said first active waveform in comparison to a first threshold;
selecting a second active waveform from a second plurality of candidate waveforms based on a second selection signal;
deriving a second evaluation signal based on a characteristic of said second active waveform in comparison to a second threshold;
deriving said first selection signal based on said first evaluation signal and on an ordering of said first plurality of candidate waveforms;
deriving said second selection signal based on said second evaluation signal and on an ordering of said second plurality of candidate waveforms;
wherein a change in the first selection signal is independent of a change in said second selection signal;
wherein said ordering of said first plurality of candidate waveforms is independent of said ordering of said second plurality of candidate waveforms;
and deriving a first stabilized signal based on said first active waveform;
deriving a second stabilied signal based on said second active waveform; and selecting a reference timing signal from said first stabilized signal and said second stabilized signal.

15. The method of claim 14 wherein said characteristic of said first active waveform is variation in frequency.

16. The method of claim 14 wherein said characteristic of said first active waveform is variation in phase.

17. The method of claim 14 further comprising:
selecting a first standby waveform from a third plurality of candidate waveforms; and
deriving a third evaluation signal based on a characteristic of said first standby waveform in comparison to a third threshold;
wherein said first selection signal is derived based on said first evaluation signal, said third evaluation signal, and on said ordering of said third plurality of candidate waveforms.

18. A method for providing a reference timing signal for use in a synchronous network, the method comprising:
selecting a first active waveform from a first plurality of candidate waveforms based on a first selection signal;
deriving a first evaluation signal based on a characteristic of said first active waveform in comparison to a first threshold;
selecting a second active waveform from a second plurality of candidate waveforms based on a second selection signal;
deriving a second evaluation signal based on a characteristic of said second active waveform in comparison to a second threshold;
deriving said first selection signal based on said first evaluation signal, said second evaluation signal, and on an ordering of said first plurality of candidate waveforms;
deriving said second selection signal based on said first evaluation signal, said second evaluation signal, and on an ordering of said second plurality of candidate waveforms;
wherein a change in the first selection signal is accompanied by a change in said second selection signal;
wherein said ordering of said first plurality of candidate waveforms is independent of said ordering of said second plurality of candidate waveforms;
and deriving a first stabilized signal based on said first active waveform;
deriving a second stabilized signal based on said second active waveform; and selecting a reference timing signal from said first stabilized signal and said second stabilized signal.

19. The method of claim 18 wherein said characteristic of said first active waveform is variation in frequency.

20. The method of claim 18 wherein said characteristic of said first active waveform is variation in phase.

21. The method of claim 18 further comprising:
selecting a first standby waveform from a third plurality of candidate waveforms; and deriving a third evaluation signal based on a characteristic of said first standby waveform in comparison to a third threshold;

wherein said first selection signal is derived based on said first evaluation signal, said third evaluation signal, and on said ordering of said third plurality of candidate waveforms.

22. A method for providing a reference timing signal for use in a synchronous network, the method comprising:

selecting an active waveform from a plurality of candidate waveforms based on a selection signal;

deriving a first evaluation signal based on a first characteristic of said active waveform in comparison to a first threshold;

selecting said active waveform from said plurality of candidate waveforms based on said selection signal;

deriving a second evaluation signal based on a second characteristic of said active waveform in comparison to a second threshold;

deriving said selection signal based on said first evaluation signal, said second evaluation signal, and on an ordering of said plurality of candidate waveforms;

and deriving a reference timing signal based on said active waveform.

23. The method of claim 22 wherein said first characteristic and said second characteristic are different.

24. The method of claim 22 wherein said first characteristic and said second characteristic are the same; and wherein said first threshold is different than said second threshold.

25. The method of claim 22 wherein said first characteristic is variation in frequency.

26. The method of claim 22 wherein said first characteristic is variation in phase.

* * * * *